US009233747B2

(12) United States Patent
Perkins et al.

(10) Patent No.: US 9,233,747 B2
(45) Date of Patent: Jan. 12, 2016

(54) DECOMPRESSION PANEL FOR USE IN AN AIRCRAFT ASSEMBLY (71) Applicant: The Boeing Company, Seal Beach, CA (US)

(72) Inventors: Thomas Perkins, Renton, WA (US); Nicole Catherine Zarfos, Newcastle, WA (US); Allan A. Loken, Kent, WA (US); Michael J. Olliges, Mill Creek, WA (US); Jeremy Ryan Glaze Tatum, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/228,576

(22) Filed: Mar. 28, 2014

(65) Prior Publication Data

US 2015/0115103 A1    Apr. 30, 2015

Related U.S. Application Data (60) Provisional application No. 61/895,717, filed on Oct. 25, 2013.

(51) Int. Cl.
*B64C 1/00* (2006.01)
*B64C 1/06* (2006.01)
*B32B 3/26* (2006.01)
*B64C 1/18* (2006.01)

(52) U.S. Cl.
CPC ............... *B64C 1/069* (2013.01); *B32B 3/266* (2013.01); *B64C 1/18* (2013.01); *B64C 2001/009* (2013.01); *Y10T 29/49995* (2015.01); *Y10T 428/24273* (2015.01)

(58) Field of Classification Search
CPC .... B64C 2001/009; B64C 1/18; B64D 13/02; B64D 13/04
See application file for complete search history.

(56) References Cited

U.S. PATENT DOCUMENTS

| 1,081,195 | A | * | 12/1913 | Austin | 454/222 |
| 2,395,233 | A | * | 2/1946 | Richardson | 454/287 |
| D153,487 | S | * | 4/1949 | Adam | D23/385 |
| 2,859,841 | A |   | 11/1958 | Reed, Jr. et al. | |
| 2,925,050 | A | * | 2/1960 | Candlin, Jr. et al. | 105/397 |
| 3,571,977 | A |   | 3/1971 | Abeel | |
| 4,033,247 | A | * | 7/1977 | Murphy | 454/76 |

(Continued)

FOREIGN PATENT DOCUMENTS

| DE | 114647 C | 3/1899 |
| DE | 1753273 A1 | 3/1971 |

(Continued)

OTHER PUBLICATIONS

International Search Report and Written Opinion of International Application No. PCT/US2014/040844, Feb. 20, 2015, 11 pages.

(Continued)

*Primary Examiner* — Tien Dinh
*Assistant Examiner* — Michael A Fabula
(74) *Attorney, Agent, or Firm* — Armstrong Teasdale LLP (57) ABSTRACT A decompression panel for use in an aircraft assembly includes a body portion including a top end and a bottom end, and an array of openings formed in the body portion. The openings in the array progressively decrease in size along a height of the body portion from the bottom end towards the top end.

15 Claims, 6 Drawing Sheets (56) References Cited

U.S. PATENT DOCUMENTS

| | | | |
|---|---|---|---|
| 4,133,852 A * | 1/1979 | DiNicolantonio et al. | 261/114.5 |
| 4,390,152 A | 6/1983 | Jorgensen | |
| 4,432,514 A * | 2/1984 | Brandon | 244/118.5 |
| RE32,554 E * | 12/1987 | Murphy | 244/118.5 |
| 4,819,548 A | 4/1989 | Horstman | |
| 4,899,960 A | 2/1990 | Hararat-Tehrani et al. | |
| 5,046,686 A | 9/1991 | Carla et al. | |
| 5,085,017 A | 2/1992 | Hararat-Tehrani | |
| 5,118,053 A * | 6/1992 | Singh et al. | 244/118.5 |
| 5,137,231 A | 8/1992 | Boss | |
| D351,903 S * | 10/1994 | Whitley, II | D23/388 |
| D353,193 S * | 12/1994 | Porter | D23/393 |
| D358,205 S * | 5/1995 | Ruhland | D23/393 |
| 5,606,829 A | 3/1997 | Hararat-Tehrani | |
| D390,948 S * | 2/1998 | Meyer | D23/393 |
| D393,708 S * | 4/1998 | Assadi | D23/388 |
| 5,792,230 A * | 8/1998 | Moore et al. | 55/493 |
| D402,356 S * | 12/1998 | Hodge | D23/365 |
| 5,871,178 A | 2/1999 | Barnett et al. | |
| 6,029,933 A * | 2/2000 | Holman et al. | 244/118.5 |
| 6,129,312 A | 10/2000 | Weber | |
| 6,129,856 A | 10/2000 | Jung et al. | |
| 6,264,141 B1 * | 7/2001 | Shim et al. | 244/118.5 |
| 6,290,445 B1 | 9/2001 | Duran et al. | |
| D456,066 S * | 4/2002 | Ching | D23/335 |
| 6,435,455 B1 | 8/2002 | Homan et al. | |
| D466,605 S * | 12/2002 | Ziegler | D23/393 |
| D469,889 S * | 2/2003 | O'Hagin | D25/199 |
| 6,601,356 B2 | 8/2003 | Snyder | |
| 6,702,230 B2 | 3/2004 | Movsesian et al. | |
| 6,817,941 B1 | 11/2004 | Gatov | |
| D504,172 S * | 4/2005 | O'Hagin | D23/393 |
| D517,193 S * | 3/2006 | Calkins | D23/395 |
| 7,234,894 B1 | 6/2007 | Flury | |
| D576,723 S * | 9/2008 | Achen | D23/393 |
| D578,633 S * | 10/2008 | Schluter et al. | D23/370 |
| D581,487 S * | 11/2008 | Wildfang | D23/249 |
| D582,029 S * | 12/2008 | Achen | D23/393 |
| D589,605 S * | 3/2009 | Reedy et al. | D23/388 |
| D597,653 S * | 8/2009 | Calkins | D23/388 |
| D606,183 S * | 12/2009 | Rosenbohm | D23/327 |
| D607,989 S * | 1/2010 | Llana Garcia | D23/395 |
| D614,753 S * | 4/2010 | DeFelice | D23/365 |
| D614,754 S * | 4/2010 | DeFelice et al. | D23/365 |
| 7,997,533 B2 * | 8/2011 | Muller | 244/129.2 |
| 8,201,775 B2 * | 6/2012 | Treimer et al. | 244/118.5 |
| 8,397,352 B2 | 3/2013 | Langediers et al. | |
| 8,460,419 B1 | 6/2013 | Hobbs | |
| D693,756 S * | 11/2013 | Stevens | D12/345 |
| 8,651,924 B1 * | 2/2014 | Jones et al. | 454/71 |
| D718,434 S * | 11/2014 | Diamond | D23/388 |
| D723,675 S * | 3/2015 | Paskow | D23/354 |
| D726,093 S * | 4/2015 | Perkins et al. | D12/345 |
| 2003/0168553 A1 | 9/2003 | Diehl et al. | |
| 2003/0222175 A1 * | 12/2003 | Movsesian et al. | 244/118.5 |
| 2004/0172889 A1 | 9/2004 | Eijkelenberg et al. | |
| 2005/0202692 A1 | 9/2005 | Zeuner et al. | |
| 2006/0240765 A1 | 10/2006 | Cheng | |
| 2009/0008502 A1 | 1/2009 | Lynas | |
| 2009/0179110 A1 | 7/2009 | Leyens | |
| 2010/0096500 A1 | 4/2010 | Benthien et al. | |
| 2010/0187358 A1 * | 7/2010 | Voss et al. | 244/129.4 |
| 2010/0320318 A1 * | 12/2010 | Roth et al. | 244/118.5 |
| 2011/0041293 A1 | 2/2011 | Langediers et al. | |
| 2012/0043421 A1 * | 2/2012 | Voss et al. | 244/118.5 |
| 2012/0234973 A1 * | 9/2012 | Hoetzeldt et al. | 244/118.5 |
| 2013/0075525 A1 | 3/2013 | Roth | |
| 2013/0139374 A1 | 6/2013 | Eilken et al. | |
| 2015/0087217 A1 * | 3/2015 | Switzer et al. | 454/76 |

FOREIGN PATENT DOCUMENTS

| | | |
|---|---|---|
| DE | 20121449 U1 | 9/2002 |
| EP | 0905018 A2 | 3/1999 |
| GB | 2312740 B | 1/2000 |

OTHER PUBLICATIONS

International Search Report and Written Opinion of International Application No. PCT/US2014/038606, Mar. 11, 2015, 13 pages.

* cited by examiner

DECOMPRESSION PANEL FOR USE IN AN AIRCRAFT ASSEMBLY

CROSS REFERENCE TO RELATED APPLICATIONS

This application claims priority to U.S. Provisional Application No. 61/895,717 filed Oct. 25, 2013, which is hereby incorporated by reference in its entirety.

BACKGROUND

The field of the present disclosure relates generally to aircraft assemblies and, more specifically, to decompression panels for use in aircraft assemblies.

At least some known aircraft include several openings defined between a passenger compartment and adjacent compartments of an aircraft cabin. Such known openings serve a dual purpose. During normal operation, the openings define an air flow path that enables conditioned air to be circulated through the aircraft cabin. During a decompression event, the openings allow large quantities of air to flow therethrough to facilitate equalizing the pressure within the aircraft cabin.

In at least some known aircraft, the openings are covered with a panel including a grille and/or louvers, and a baffle is positioned behind the panel to facilitate reducing noise caused by the air flowing therethrough. The grille and/or louvers are generally designed to allow the passage of air through the openings while restricting the passage of debris and other foreign material therethrough. However, a grille and/or louvers assembly is generally fabricated from materials that facilitate increasing the weight of the aircraft, is difficult to clean, and has a configuration that facilitates limiting the size of noise-reducing baffles that may be installed behind the panel. Moreover, a grille and/or louvers assembly may be aesthetically unpleasant to passengers seated in the aircraft cabin.

BRIEF DESCRIPTION

In one aspect, a decompression panel for use in an aircraft assembly is provided. The decompression panel includes a body portion including a top end and a bottom end, and an array of openings formed in the body portion. The openings in the array progressively decrease in size along a height of the body portion from the bottom end towards the top end.

In another aspect, an aircraft assembly is provided. The aircraft assembly includes a side wall, a floor panel, and a decompression panel coupled between the side wall and the floor panel. The decompression panel includes a body portion including a top end and a bottom end, and an array of openings formed in the body portion. The openings in the array progressively decrease in size along a height of the body portion from the bottom end towards the top end.

In yet another aspect, a method of forming a decompression panel for use in an aircraft assembly is provided. The method includes providing a body portion that includes a top end and a bottom end, and forming an array of openings in the body portion, wherein openings in the array progressively decrease in size along a height of the body portion from the bottom end towards the top end.

DETAILED DESCRIPTION

The implementations described herein relate to a decompression panel for use in an aircraft assembly. More specifically, the decompression panel includes a body portion and an array of openings defined in the body portion. The array is configured such that the openings progressively increase in size along a height of the body portion to facilitate increasing the aesthetic appearance of the decompression panel to passengers seated in an aircraft cabin. Moreover, the openings are angled relative to an outer surface of the decompression panel to facilitate obscuring the view of the passengers through the openings, and to facilitate reducing retention of foreign material in the openings.

Figure 1:
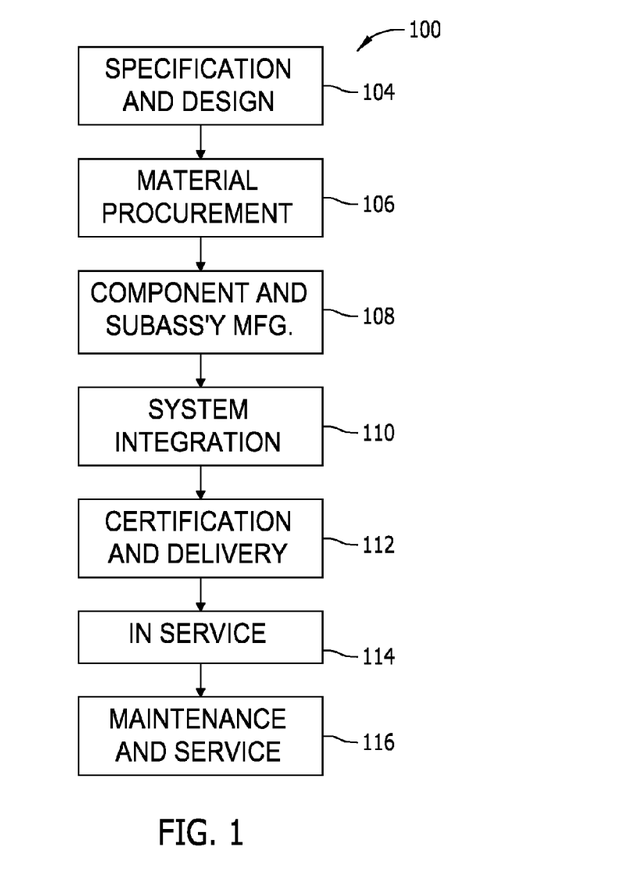
FIG. 1 is a flow diagram of an exemplary aircraft production and service methodology.
Figure 2:
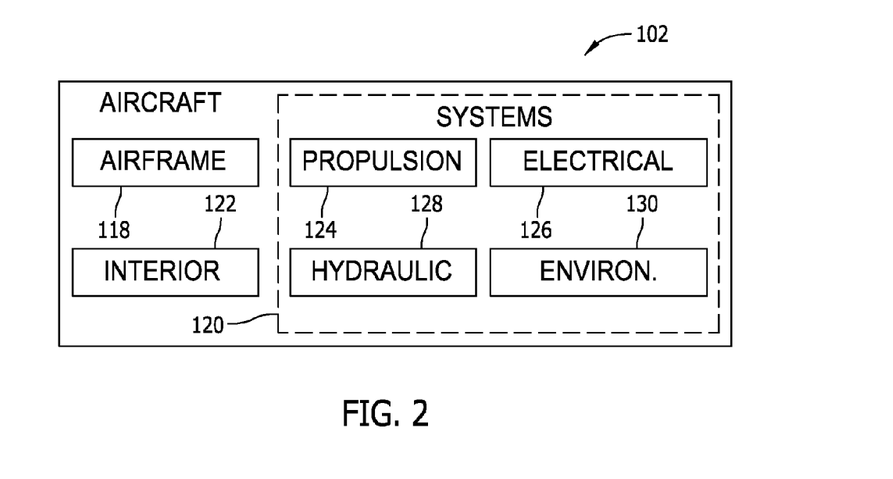
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
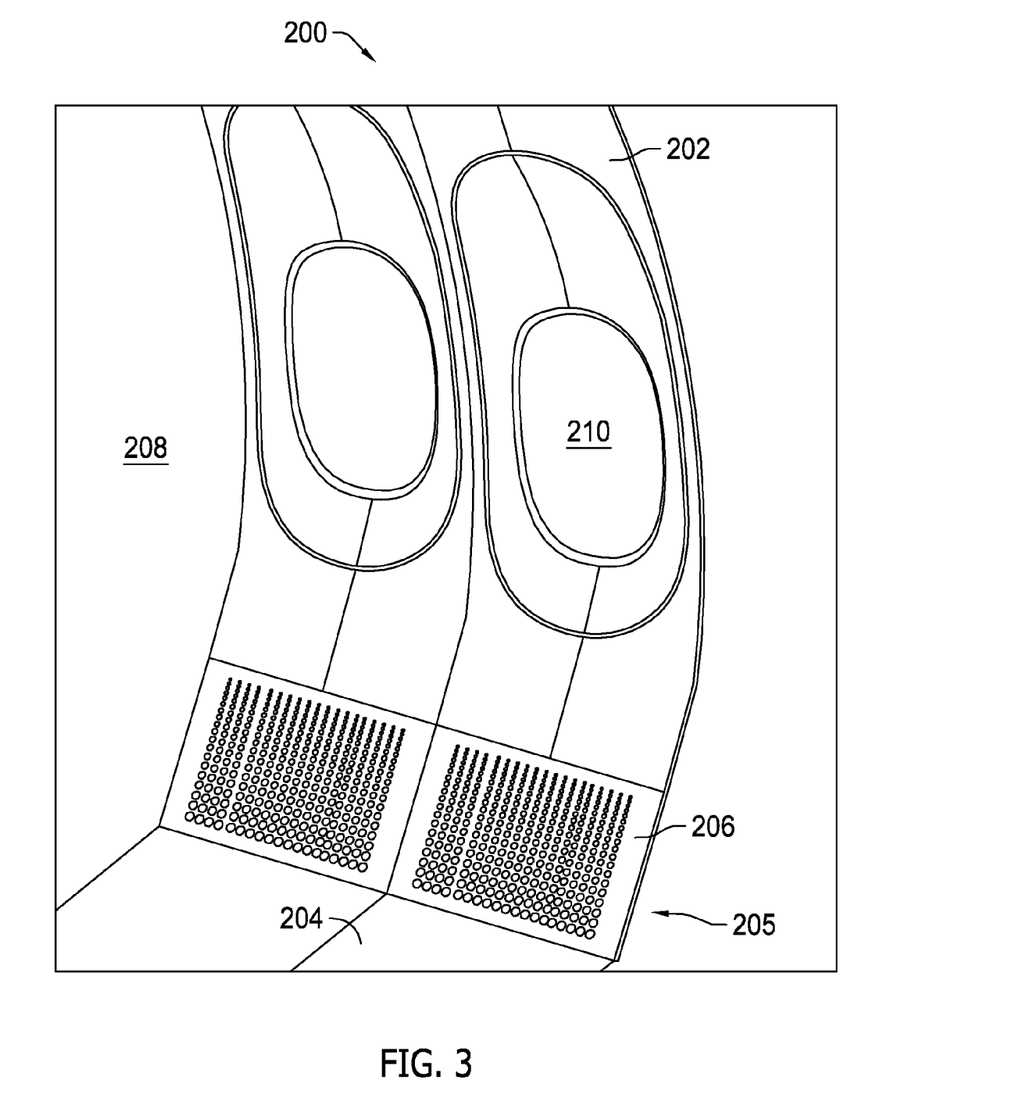
FIG. 3 is a perspective sectional view of an exemplary aircraft cabin.

FIG. 3 is a perspective sectional view of an exemplary aircraft cabin 200 that may be used with aircraft 102 (shown in FIG. 2). In the exemplary implementation, aircraft cabin 200 includes a side wall 202, a floor panel 204, and a decompression panel assembly 205 coupled therebetween that at least partially define an interior 208 of aircraft cabin 200. Side wall 202 also includes a window opening 210 defined therein. In operation, decompression panel assembly 205 facilitates circulating conditioned air through aircraft cabin 200 and/or facilitates equalizing the pressure in aircraft cabin 200 during a decompression event.

Figure 4:
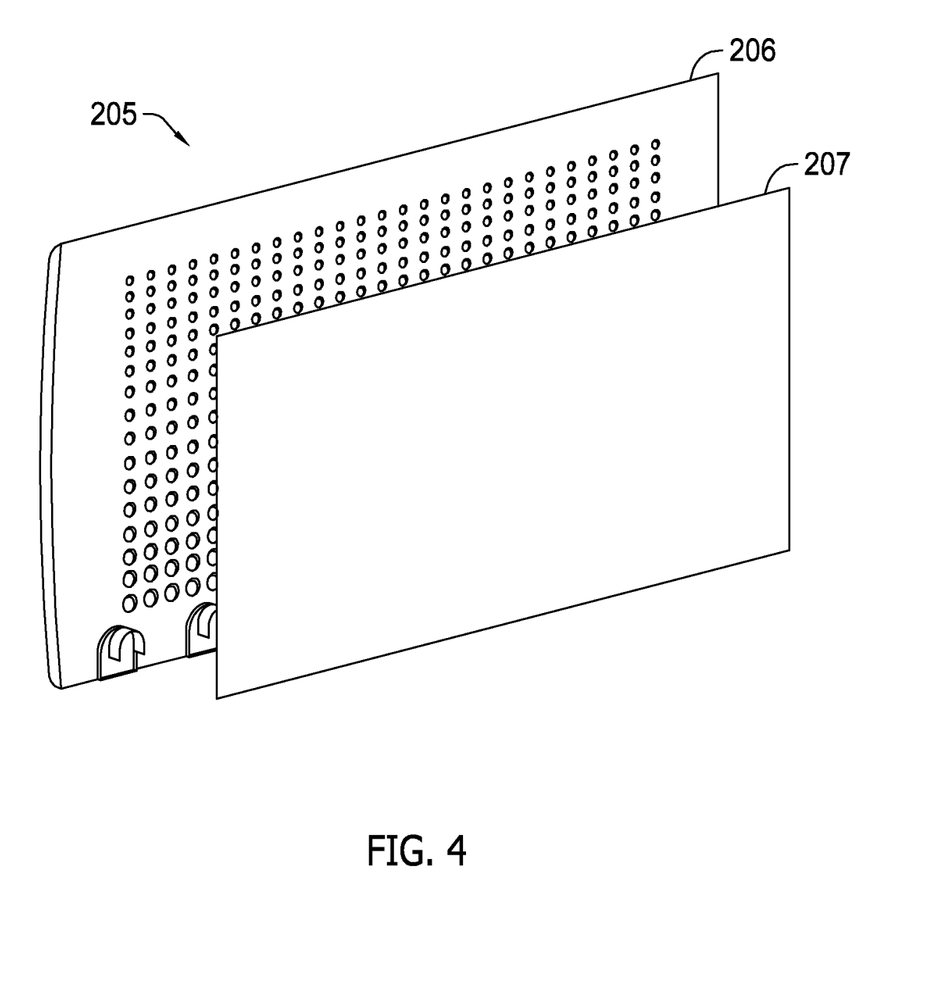
FIG. 4 is a perspective exploded view of an exemplary decompression panel assembly that may be used in the aircraft cabin shown in FIG. 3.
Figure 5:
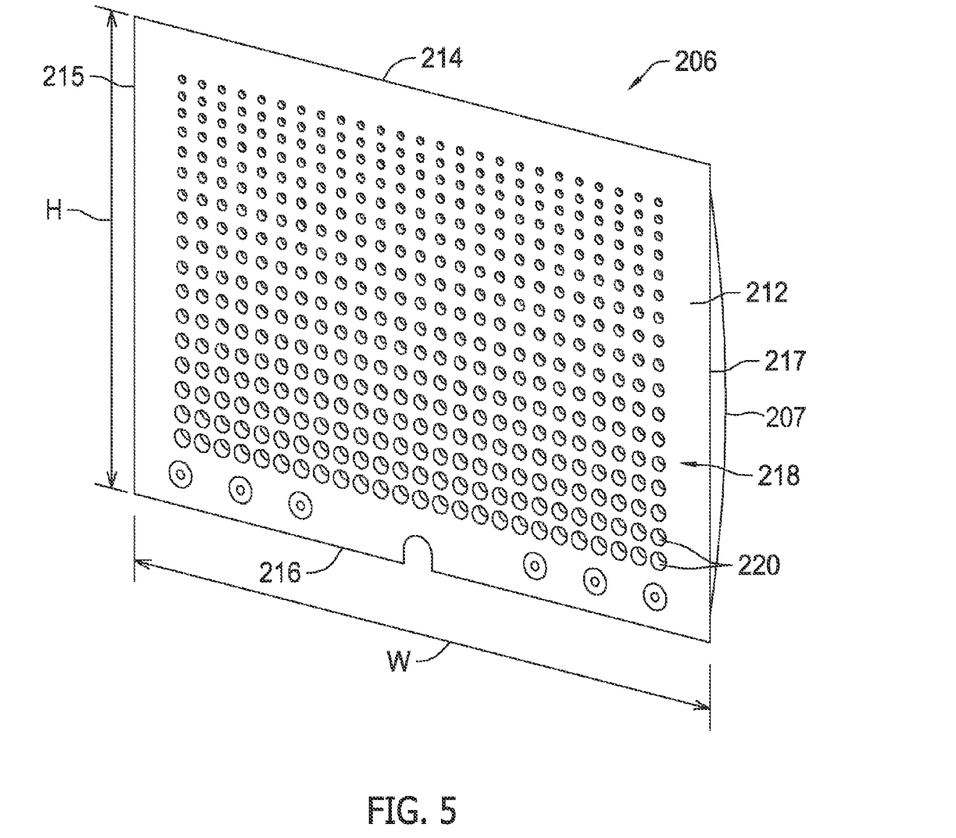
FIG. 5 is a perspective view of an exemplary decompression panel that may be used in the decompression panel assembly shown in FIG. 4.

FIG. 4 is a perspective exploded view of decompression panel assembly 205, and FIG. 5 is a perspective view of decompression panel 206 that may be used in aircraft cabin 200. In the exemplary implementation, decompression panel assembly 205 includes a decompression panel 206 and a baffle 207 to be coupled to decompression panel 206. Baffle 207 facilitates attenuating noise in aircraft cabin 200 during operation. Decompression panel 206 includes a body portion 212 having a top end 214 and a bottom end 216. Decompression panel 206 also includes an array 218 of openings 220 defined in body portion 212 that facilitate channeling air flow (not shown) through decompression panel 206.

Decompression panel 206 may be fabricated from any suitable material. Exemplary materials include, but are not limited to, thermoplastic polymeric materials. As such, decompression panel 206 may be fabricated in a single die, injection molding process.

In the exemplary implementation, openings 220 at top end 214 have a first cross-sectional area and openings at bottom end 216 have a second cross-sectional area that is greater than the first cross-sectional area. More specifically, openings 220 progressively increase in size along a height H of body portion 212 defined between top end 214 and bottom end 216. As such, openings 220 of substantially similar size are substantially aligned across a width W of body portion 212 defined between a first end 215 and a second end 217 of decompression panel 206. Moreover, openings 220 of smaller size are defined at top end 214 such that they are located nearest to passengers (not shown) seated in aircraft cabin 200 (shown in FIG. 3). As such, it will be more difficult for the passengers to access behind decompression panel 206 from interior 208 (shown in FIG. 3) of aircraft cabin 200 through the smaller sized openings 220. Openings 220 of larger size are defined at bottom end 216 to facilitate controlling air flow through decompression panel 206 during non-decompression operation.

Openings 220 have any cross-sectional shape that enables decompression panel 206 to function as described herein. In the exemplary implementation, openings 220 have a substantially elliptical cross-sectional shape and a diameter within a range between about 0.25 inch and about 0.5 inch. As such, openings 220 have a cross-sectional area less than about 0.8 inches squared to facilitate restricting access behind decompression panel 206 from interior 208 of aircraft cabin 200. Array 218 also defines an open surface area in body portion 212 of up to about 75 inches squared.

As described above, decompression panel 206 is coupled between side wall 202 and floor panel 204 (each shown in FIG. 3). In the exemplary implementation, decompression panel 206 is oriented such that top end 214 of body portion 212 is coupled to side wall 202, and bottom end 216 of body portion 212 is coupled to floor panel 204. More specifically, decompression panel 206 is oriented such that the smaller-sized openings 220 are adjacent to side wall 202, and the larger-sized openings 220 are adjacent to floor panel 204. As such, progressively increasing the size of openings 220 from top end 214 to bottom end 216 facilitates improving the aesthetic appearance of decompression panel 206 to passengers (not shown) seated in aircraft cabin 200 (shown in FIG. 3) when viewed from above floor panel 204.

Figure 6:
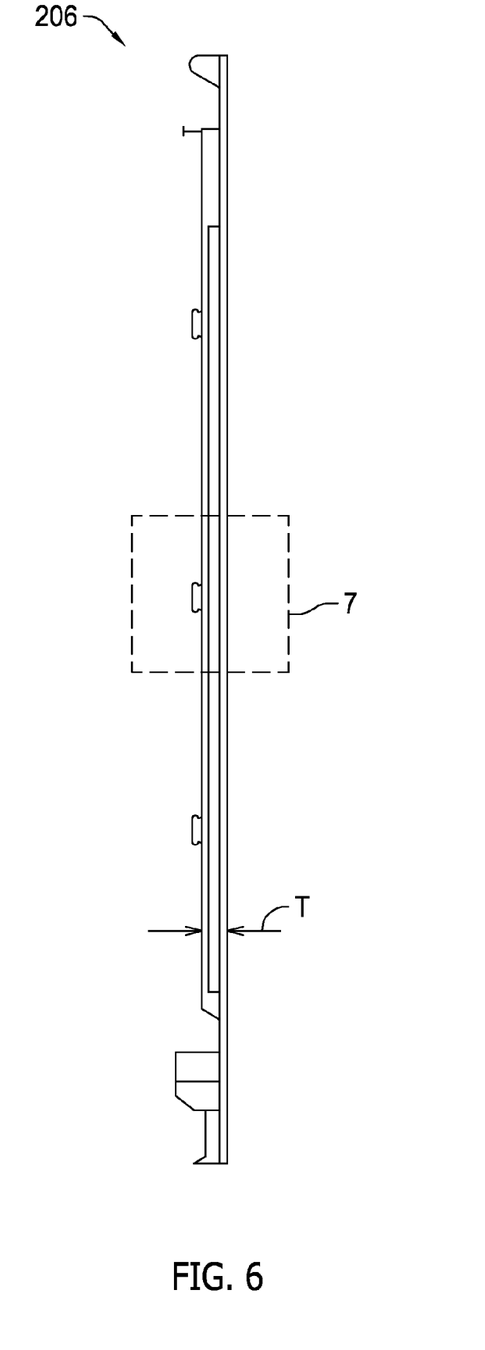
FIG. 6 is a side view of the decompression panel shown in FIG. 5.
Figure 7:
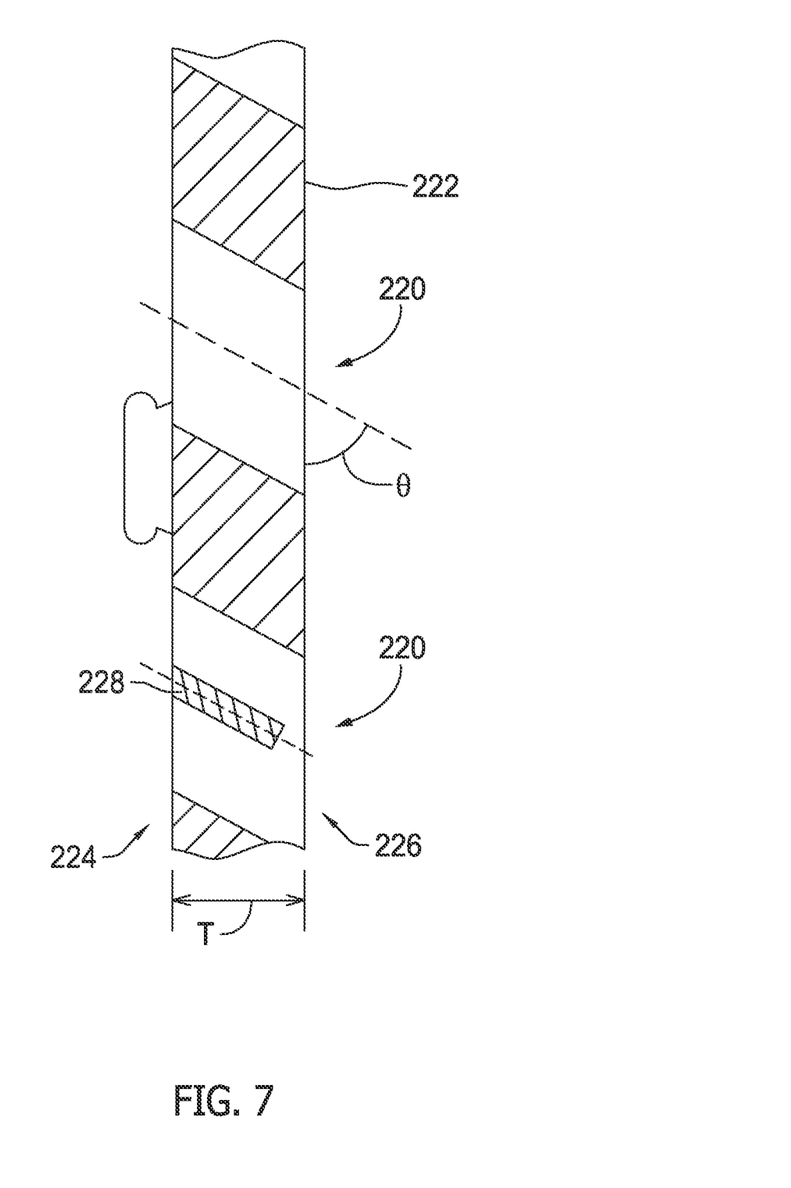
FIG. 7 is an enlarged cross-sectional view of the decompression panel shown in FIG. 6 and taken along Area 7.

FIG. 6 is a side view of decompression panel 206, and FIG. 7 is an enlarged cross-sectional view of decompression panel 206 taken along Area 7. In the exemplary implementation, openings 220 extend through body portion 212 at an oblique angle θ relative to an outer surface 222 of body portion 212. Openings 220 may be angled at any degree that enables decompression panel 206 to function as described herein. For example, in the exemplary implementation, openings 220 are angled at less than about 90 degrees relative to outer surface 222. Moreover, openings 220 are angled towards floor panel 204 (shown in FIG. 3) as openings 220 extend from a first side 224 of decompression panel 206 towards a second side 226 of decompression panel 206. As such, the line-of-sight of passengers (not shown) seated in aircraft cabin 200 (shown in FIG. 3) through openings 220 is substantially obscured when viewed from above floor panel 204. Moreover, angling openings 220 relative to outer surface 222 facilitates limiting an amount of foreign material retained therein by facilitating gravity drainage of foreign material from openings 220.

Body portion 212 has any thickness T that enables decompression panel 206 to function as described herein. For example, in the exemplary implementation, thickness T is defined within a range between about 0.2 inch and about 0.5 inch. As such, thickness T is less than other known decompression panels to facilitate decreasing an available volume for retention of foreign material within openings 220 and facilitates reducing the weight of decompression panel 206. Moreover, decreasing thickness T enables a thicker baffle 207 (shown in FIG. 4) to be coupled to decompression panel 206 to provide more noise attenuation within cabin 200 during operation. Body portion 212 also includes one or more stiffening members 228 extending from first side 224 of decompression panel 206 and at least partially through at least one opening 220 to facilitate increasing the strength of decompression panel 206 in predetermined localized areas of body portion 212. Stiffening members 228 also extend across body portion 212 and are also substantially aligned with a plurality of openings 220.

A method of forming a decompression panel for use in an aircraft assembly is also provided. The method includes providing a body portion that includes a top end and a bottom end and forming an array of openings in the body portion, wherein openings in the array progressively decrease in size along a height of the body portion from the bottom end towards the top end. Forming the array of openings can include forming the openings to be substantially similarly sized along a width of the body portion from a first end towards a second end of the body portion. Moreover, forming the array of openings can include extending the openings through the body portion at an oblique angle relative to an outer surface of the body portion. In a particular embodiment, forming the array of openings includes forming each opening having a cross-sectional area of less than about 0.8 inches squared. The method further includes forming at least one stiffening member in the body portion, the at least one stiffening member extending from a first side of the body portion and at least partially through at least one of the openings. Forming at least one stiffening member can include extending the at least one stiffening member across the body portion to be substantially aligned with a plurality of the openings.

The decompression panel described herein includes an array of openings defined therein that facilitate at least one of (a) increasing air flow through the decompression panel over other known decompression panels; (b) improving an aesthetic appearance of the decompression panel; (c) restricting access to behind the decompression panel through the openings; and (d) limiting retention of foreign material in the openings. Moreover, the configuration of the array facilitates reducing an overall weight of the decompression panel by reducing material usage when compared to other known decompression panels while simultaneously retaining its impact resistance. As such, reducing the overall weight of the decompression panel enables a larger baffle to be implemented behind the decompression panel to facilitate enhancing noise reduction in the aircraft cabin.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A decompression panel for use in an aircraft assembly, said decompression panel comprising:
    a body portion comprising a top end and a bottom end; and
    an array of openings formed in said body portion, wherein openings in said array progressively decrease in size along a height of said body portion from said bottom end towards said top end.

2. The decompression panel in accordance with claim 1, wherein said openings in said array are substantially similarly sized along a width of said body portion from a first end towards a second end of said body portion.

3. The decompression panel in accordance with claim 1, wherein said openings extend through said body portion at an angle relative to an outer surface of said body portion such that said openings are obliquely oriented relative to the outer surface.

4. The decompression panel in accordance with claim 1, wherein each of said openings have a cross-sectional area less than about 0.8 inches squared.

5. The decompression panel in accordance with claim 1, wherein said array of openings define an open surface area in said body portion of up to about 75 inches squared.

6. An aircraft assembly comprising:
    a side wall;
    a floor panel; and
    a decompression panel coupled between said side wall and said floor panel, said decompression panel comprising:
        a body portion comprising a top end and a bottom end; and
        an array of openings formed in said body portion, wherein openings in said array progressively decrease in size along a height of said body portion from said bottom end towards said top end.

7. The assembly in accordance with claim 6, wherein said openings in said array are substantially similarly sized along a width of said body portion from a first end towards a second end of said body portion.

8. The assembly in accordance with claim 6, wherein said openings extend through said body portion at an angle relative to an outer surface of said body portion such that said openings are obliquely oriented relative to the outer surface.

9. The assembly in accordance with claim 8, wherein said openings extend from a first side towards a second side of said body portion such that said openings are angled towards said floor panel.

10. The assembly in accordance with claim 6 further comprising a baffle coupled to said decompression panel.

11. The assembly in accordance with claim 6, wherein smaller sized openings in said array are positioned adjacent said side wall, and larger sized openings in said array are positioned adjacent said floor panel.

12. A method of forming a decompression panel for use in an aircraft assembly, said method comprising:
    providing a body portion that includes a top end and a bottom end; and
    forming an array of openings in the body portion, wherein openings in the array progressively decrease in size along a height of the body portion from the bottom end towards the top end.

13. The method in accordance with claim 12, wherein forming an array of openings comprises forming the openings to be substantially similarly sized along a width of the body portion from a first end towards a second end of the body portion.

14. The method in accordance with claim 12, wherein forming an array of openings comprises extending the openings through the body portion at an oblique angle relative to an outer surface of the body portion.

15. The method in accordance with claim 12, wherein forming an array of openings comprises forming each opening having a cross-sectional area of less than about 0.8 inches squared.

* * * * *